US009808789B2

(12) United States Patent
Chin et al.

(10) Patent No.: US 9,808,789 B2
(45) Date of Patent: Nov. 7, 2017

(54) METHOD FOR REGENERATING A USED SORBENT HAVING A GAS ADSORBATE ADSORBED THERETO

(71) Applicant: AGENCY FOR SCIENCE, TECHNOLOGY AND RESEARCH, Singapore (SG)

(72) Inventors: Jia Min Chin, Singapore (SG); Jin Yang, Singapore (SG); Han Yang Tan, Singapore (SG); Yin Ngai Sum, Singapore (SG); Siok Wei Tay, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 15/305,336

(22) PCT Filed: Apr. 16, 2015

(86) PCT No.: PCT/SG2015/050075
§ 371 (c)(1),
(2) Date: Oct. 19, 2016

(87) PCT Pub. No.: WO2015/163819
PCT Pub. Date: Oct. 29, 2015

(65) Prior Publication Data
US 2017/0036192 A1 Feb. 9, 2017

(30) Foreign Application Priority Data

Apr. 22, 2014 (SG) ............................ 10201401701Y

(51) Int. Cl.
*B01J 20/34* (2006.01)
*B01J 20/06* (2006.01)
*B01J 20/08* (2006.01)
*B01D 53/14* (2006.01)

(52) U.S. Cl.
CPC ...... *B01J 20/3483* (2013.01); *B01D 53/1425* (2013.01); *B01D 53/1462* (2013.01); *B01J 20/06* (2013.01); *B01J 20/08* (2013.01); *B01J 20/3441* (2013.01); *B01D 2252/2023* (2013.01); *B01D 2252/20405* (2013.01); *B01D 2252/20421* (2013.01); *B01D 2252/20426* (2013.01); *B01D 2252/20484* (2013.01); *B01D 2252/20489* (2013.01); *B01D 2252/30* (2013.01); *B01D 2252/504* (2013.01); *B01D 2252/604* (2013.01)

(58) Field of Classification Search
CPC ... B01J 20/34; B01J 20/3483; B01D 53/1425; B01D 53/1462

USPC .............................................................. 502/56
See application file for complete search history.

(56) References Cited

U.S. PATENT DOCUMENTS

| | | | |
|---|---|---|---|
| 5,767,493 A | 6/1998 | Lautenschlager | |
| 2011/0229393 A1 | 9/2011 | Hu | |
| 2011/0315014 A1 | 12/2011 | Wei et al. | |
| 2012/0321538 A1* | 12/2012 | Hu | B01D 53/1462 423/220 |

FOREIGN PATENT DOCUMENTS

| | | |
|---|---|---|
| WO | WO 2008/021700 A1 | 2/2008 |
| WO | WO 2014/189470 A1 | 11/2014 |

OTHER PUBLICATIONS

PCT Notification of Transmittal of the International Search Report and the Written Opinion of the International Searching Authority, or the Declaration for PCT Counterpart Application No. PCT/SG2015/050075, 10 pp., (dated Jun. 29, 2015).
PCT Notification Concerning Transmittal of International Preliminary Report on Patentability (Chapter I of the Patent Cooperation Treaty) for PCT Counterpart Application No. PCT/SG2015/050075, 6 pages, (dated Nov. 3, 2016).
Owen J. Curnow, et al., "Regeneration of Carbon Dioxide Saturated Monoethanolamine-Glycol Aqueous Solutions at Atmospheric Pressure in a Packed Bubble Reactor", Ind. Eng. Chem. Res., vol. 44, No. 4, pp. 1085-1089, (2005).
Mark J. Gronnow, et al., "Energy Efficiency in Chemical Reactions: A Comparative Study of Different Reaction Techniques", Organic Process Research & Development, vol. 9, No. 4, pp. 516-518, (2005).
Tahseen Razzaq, et al., "On the Energy Efficiency of Microwave-Assisted Organic Reactions", ChemSusChem, vol. 1, pp. 123-132, (2008).
Jonathan D. Moseley, et al., "A critical assessment of the greenness and energy efficiency of microwave-assisted organic synthesis", Green Chem., vol. 13, pp. 794-806, (2011).
George S. Goff, et al., "Monoethanolamine Degradation: $O_2$ Mass Transfer Effects under $CO_2$ Capture Conditions", Ind. Eng. Chem. Res., vol. 43, No. 20, pp. 6400-6408, (2004).

* cited by examiner

*Primary Examiner* — Edward Johnson
(74) *Attorney, Agent, or Firm* — Blakely, Sokoloff, Taylor & Zafman LLP

(57) ABSTRACT

The invention relates to methods for regenerating a used sorbent having a gas adsorbate adsorbed thereto. In particular, the used sorbent comprises liquid marbles. The liquid in the liquid marbles is comprised of a material or mixture of materials that selectively removes unwanted gaseous component in the gas to be purified.

20 Claims, 2 Drawing Sheets

METHOD FOR REGENERATING A USED SORBENT HAVING A GAS ADSORBATE ADSORBED THERETO

CROSS-REFERENCE TO RELATED APPLICATIONS

This patent application is a U.S. National Phase Application under 35 U.S C. §371 of International Application No. PCT/SG2015/050075, filed Apr. 16, 2015, entitled METHOD FOR REGENERATING A USED SORBENT HAVING A GAS ADSORBATE ADSORBED THERETO, which claims the benefit of priority of Singapore Patent Application No. 10201401701 Y, filed Apr. 22, 2014, the contents of which were incorporated by reference in their entirety for all purposes.

TECHNICAL FIELD

The invention relates to methods for regenerating a used sorbent having a gas adsorbate adsorbed thereto. In particular, the used sorbent comprises liquid marbles. The liquid in the liquid marbles is comprised of a material or mixture of materials that selectively removes unwanted gaseous component in the gas to be purified.

BACKGROUND

Natural gas, which is used by household consumers, is composed primarily of methane. Prior to use, it must be filtered, stripped of crude oil and other higher boiling alkanes (e.g. ethane, propane, or pentane), dehydrated, and "sweetened", whereby $CO_2$ and $H_2S$ are removed from the natural gas. Amongst these purification steps, both 1) the dehydration step and 2) the "sweetening" step could benefit significantly from using purification agents with increased surface area.

In the dehydration step, the gas is treated with ethylene glycols (mono-, di-, tri-, etc.) to remove water. Due to the high affinity of glycols for water, the wet gas that flows through a 'contactor', which is in essence a tower packed with mesh or bubble cap trays that maximize contact between the glycol (dessicant) and the gas, is dried through its interaction with the glycols.

The removal of acid gases from raw natural gas is referred to as "gas sweetening". Raw natural gas typically contains far higher levels of $CO_2$ and $H_2S$ than are allowed in the final product. The corrosive nature of the acidic gases and the toxicity of $H_2S$ are amongst the principle reasons for minimization of their contamination in natural gases. During the gas "sweetening" step, where $H_2S$ and $CO_2$ are removed, the gas flows through an amine-containing contactor or through a column of agitated amine solution. The amine absorbs and reacts with $H_2S$ and $CO_2$, thus removing the acidic gases from the gas mixture.

In both steps, the contact of the purifying liquids with crude or unpurified natural gas is important. By enhancing the contact area of the liquids with the gas, the efficiency and rate of purification would increase. Further, the domain size of the liquids is decreased by discretizing the liquids into micronized droplets, thus enhancing mass transport of gases (in particular gases to be absorbed) into the sorbent. This would allow the usage of shorter purification columns/contactors and higher gas flow rates. Also, energy could be saved because there would be a decreased need for agitation of viscous liquids like diethanolamine (DEA) or monoethanolamine (MEA), which are widely used in gas sweetening processes.

In industrial gas purification set-ups, neat MEA is rarely used. Most commonly, a 20-30 wt % aqueous solution of MEA is utilized instead. This is due to the high viscosity of neat MEA (approximately 24 times that of water at 20° C.) as well as its corrosive nature. High liquid viscosity results in difficulty of liquid agitation and transport through the gas contactors. Neat DEA and triethanolamine (TEA) have even higher viscosity than that of MEA, and their agitation for enhanced surface interaction with the gases demands even more energy.

To address the above drawbacks, dry liquids, or otherwise known as micronized droplets of liquids, are used in gas purification steps, in particular, but not limited to, gas sweetening and dehydration of raw natural gases, and also the purification of flue or waste gases. See, for example, the contents of PCT Publication No. WO 2014/189470 entitled "Method For Purifying Gas Using Liquid Marbles". Such dry liquids or liquid marbles are employed as sorbents to adsorb $H_2S$ and $CO_2$, for example.

To make the gas purification process more economically feasible, it is desirable to regenerate or recover the used sorbents after having a gas adsorbate adsorbed thereto. As mentioned above, common amines used in the gas purification step are MEA and DEA, which are extremely viscous. Frequently, to reduce the viscosity of these amines, they are diluted with water. This imposes a considerable energy cost on removing carbon dioxide since much energy is used in heating up water (which has a high heat capacity) during the sorbent regeneration step.

For the removal of carbon dioxide from flue gases (and not just for natural gas processing), amine scrubbing is also a commonly used method. Upon adsorption of carbon dioxide by amines, carbamates are formed. The amine is regenerated by the cleavage of the C—N bond of the carbamate, removing carbon dioxide in the process. This is achieved by the vigorous heating of the carbamates.

However, the regeneration of gas sorbents poses various difficulties, particularly when they are in the dry liquid form. For example, in the regeneration of dry MEA, the monoethanolamine is progressively oxidized and some MEA is lost as vapor during the regeneration process due to the purge gas flow as well as the heat input.

Another limitation of highly porous materials such as powderized or dry liquid sorbents is the low efficiency of heat transfer throughout the material during the regeneration process.

In the case of bulk liquid sorbents, the process of heat transfer through the sorbents is largely by the three mechanisms of conduction, convection and radiation.

During the regeneration of the liquid sorbent, the sorbent is heated to induce desorption of adsorbed gases, whereby the gases may be either chemisorbed or physisorbed. However, in highly porous materials, because of the low efficiency of heat transfer, non-uniform heating of the sorbents may present a problem, particularly for large volumes of sorbents.

Therefore, there remains a need to provide for a cost effective and efficient method of regenerating used sorbents employed in gas purification processes.

SUMMARY

The inventors have found a method to regenerate dry liquids or used sorbents, which method is fast, energy efficient, and overcomes the drawbacks mentioned in previous section. Advantageously, the regeneration method does not require or minimizes use of an inert purge gas.

To this end, the regeneration method makes use of heat transfer by radiation rather than conduction to reduce the heating time required, allowing the overall regeneration process to be much more efficient both in terms of time and energy.

Thus, according to one aspect of the invention, there is disclosed a method for regenerating a used sorbent having a gas adsorbate adsorbed thereto, comprising exposing the used sorbent to dielectric heating. By utilizing dielectric heating, the external container does not need to be heated in order to transfer energy to the used sorbent. Preferably, the dielectric heating involves exposure to microwave radiation.

The gas adsorbate may comprise natural gas, flue gas, carbon monoxide, carbon dioxide, hydrogen sulfide, water vapour, a sulfur-containing gas, a malodorous gas, a toxic gas, or a mixture thereof.

The used sorbent may comprise a liquid marble, wherein the liquid marble is comprised of a plurality of particles and/or mixture of a plurality of particles encapsulating at least one type of liquid therein.

Microwave-assisted chemical reactions have been extensively reported to show increased product yield, extremely shorter processing time, and enhanced product properties or material properties, when compared to conventional heating techniques using oil baths. In present application, it is demonstrated that the time to reach the required temperature (120° C.) reduced from 10-20 minutes using oil baths to only 30 seconds' ramping time with microwave heating. Under the same conditions, the regeneration of the dry diethanolamines (DEA) solvents took only 1 hour compared to 2-3 hours using conventional oil bath, when running at the specified temperature (120° C.). As the actual power supplied by the microwave to reach the specified temperature is also less than that by the hotplate, the actual energy consumption using microwave heating for the regeneration will be in the order of tenth of that with hotplate, which is supported by the references that microwave-assisted chemical reactions requires only a small fraction (5-10%) of the energy needed for the traditional oil-bath heating.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

DETAILED DESCRIPTION

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural and chemical changes may be made without departing from the scope of the invention. The various embodiments are not necessarily mutually exclusive, as some embodiments can be combined with one or more other embodiments to form new embodiments.

For brevity, convenience, and ease of understanding the invention, it is herein described in various embodiments gas sorbents existing in dry liquid or liquid marble forms, also known as powderized liquids. It is to be understood and appreciated that the scope of present invention is not limited to such forms.

It is well known to persons skilled in the art that dry water (or powderized water) essentially refers to micronized droplets of water encapsulated by hydrophobic particles. Dry water is of wide interest to the industrial community, for example, for the use of cosmetic compositions and also as dry paints.

On a similar note, the term "dry oil" as used herein refers to micronized liquid marbles of oil-based liquids.

On a similar note, the term "dry gel" as used herein refers to micronized liquid marbles whereby a gelling agent is included in the encapsulated material within the liquid marble. The gelling agent may be, but not limited to, fumed silica or hydrophobic silica so as to increase the stability of the dry form of the gel.

Accordingly, besides water, alternative liquids with high surface tensions could also form micronized droplets encapsulated by particles which are relatively phobic towards the liquid of choice. By doing so, the effective surface area of the liquid is increased because the encapsulating shell is very highly porous. Further, the domain size of the liquid is decreased by converting the liquid from bulk liquid into discrete liquid droplets, hence enhancing mass transport of gases into the liquid.

Figure 1:
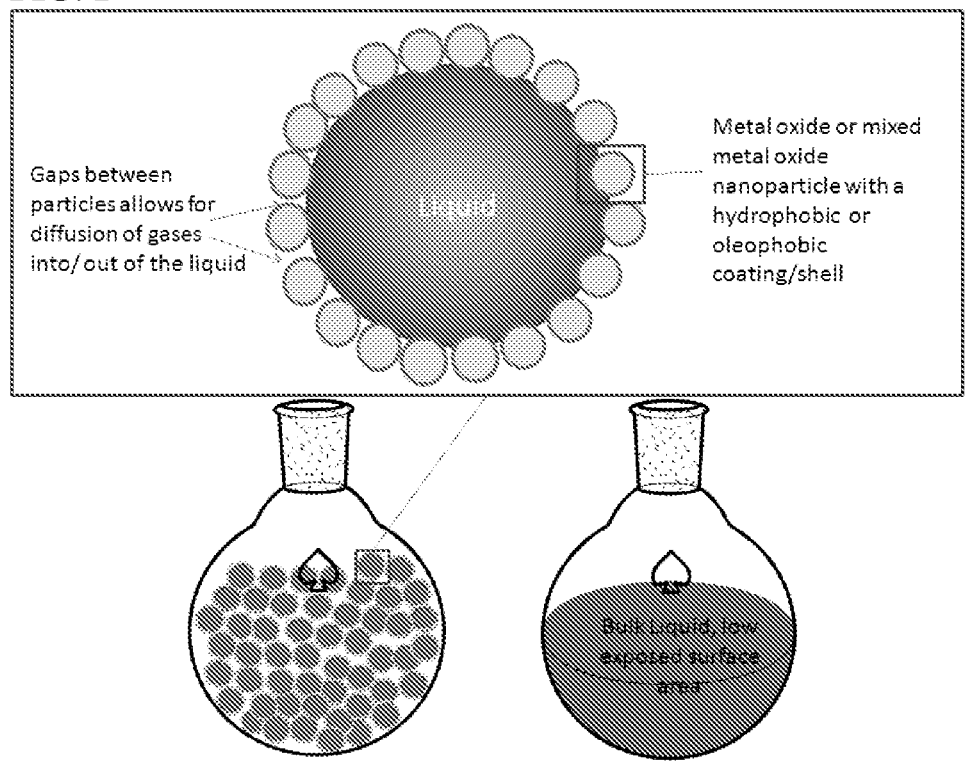
FIG. 1 illustrates a liquid droplet encapsulated by particles of low surface energy.

FIG. 1 illustrates a liquid droplet encapsulated by particles of low surface energy. Since the particles form a highly porous shell on the surface of the liquid, there is very rapid diffusion of gases into and out of the liquid through the particle gaps.

Based on the above phenomenon, present inventors have earlier identified a use for such micronized liquid droplets encapsulated by porous particulate shells for the enhancement of gas absorption. For example, by enhancing gas absorption and exchange rates, heterogeneous reactions where one of the reagents is in the gas phase would be accelerated significantly. More details on the use of micronized liquid droplets for gas absorption can be found in PCT Publication No. WO 2014/189470 entitled "Method For Purifying Gas Using Liquid Marbles", the contents of which are incorporated herein in its entirety.

Briefly, PCT Publication No. WO 2014/189470 describes a method for purifying gas. The method includes exposing the gas to be purified to at least one type of liquid marble, for example, micronized liquid marbles. The liquid marble may be comprised of a plurality of particles and/or mixture of a plurality of particles encapsulating at least one type of liquid therein. The plurality of particles may comprise nanoparticles, sub-micron particles, or microparticles. The liquid may also be comprised of a gelling agent, such as but not limited to, fumed silica or hydrophobic silica so as to increase the stability of the dry form.

In present context, the gas to be purified is comprised of a mixture of gaseous components. For example, the gas may comprise a bulk gas and at least one unwanted gaseous component. By "purified" is meant that one or more of the unwanted (i.e. undesirable) gaseous components is removed, such as, but not limited to, absorption, from the bulk gas by the liquid marble. It is to be understood that the purifying step may remove a substantial portion of the unwanted gaseous component from the bulk gas and may not necessarily be 100% removal. In other words, the gas is said to be purified when the amount of unwanted gaseous component remaining in the bulk gas is reduced to a predetermined acceptable level. In various embodiments, the bulk gas may be natural gas (unprocessed) or flue (waste) gas. In various embodiments, the unwanted gaseous components may include carbon dioxide, carbon monoxide, hydrogen sulfide, sulfur-containing gas, water vapour, or any malodorous gas and toxic gas.

As mentioned in earlier paragraphs, the gas purification process can be made more economically feasible and environmentally friendly if used sorbents can be regenerated in a cost effective and efficient manner. To this end, one aspect of the present invention relates to a method for regenerating a used sorbent having a gas adsorbate adsorbed thereto, comprising exposing the used sorbent to dielectric heating. By utilizing dielectric heating, the external container does not need to be heated in order to transfer energy to the used sorbent.

The gas adsorbate may comprise natural gas, flue gas, carbon monoxide, carbon dioxide, hydrogen sulfide, water vapour, a sulfur-containing gas, a malodorous gas, a toxic gas, or a mixture thereof.

The advantage of employing dielectric heating as a heat transfer mechanism in present method can be further elaborated as follows.

Thermal conduction takes places when heat flows from a hotter object to a cooler one. The heat transfer mechanism is thus: the rapidly vibrating atoms and molecules of a hot object transfer energy to atoms and molecules of a cold object, thereby heating it up. For heating by conduction to be efficient, the two objects should be in direct contact with each other.

Regenerating used sorbents such as dry DEA by conduction is not efficient as the fluorinated silica of the liquid marble, for example, may not transfer heat well and it also consumes some energy as it is also heated up. Time is also required for the heat to be distributed uniformly within the encapsulated DEA.

Heat transfer by convection occurs by the movement of fluids so it is essentially heat transfer via mass transfer. Again, in the case of dry liquids, heat transfer by convection is very inefficient, because the micronized liquid droplets behave like microparticles rather than bulk liquid. The fluid movement of the liquid is very limited (not including the air phase, since air has very low heat capacity) compared to that of the bulk liquid.

On the other hand, dielectric heating involves increasing the temperature of an object by the application of microwave (electromagnetic) radiation. This is most evident in objects containing polar molecules (such as water molecules), which have an electrical dipole moment. In an electric field, polar molecules will align themselves with the field. If the field is oscillating, as it is in an electromagnetic wave, these molecules continuously rotate to align with the ever-changing field. This is called dipole rotation. Rotating molecules push, pull, and collide with other molecules, distributing the energy to adjacent molecules. This energy appears as heat, which raises the temperature of the object. Dipole rotation is the mechanism in which microwave radiation is used to increase the temperature of an object. Unlike conduction, dielectric heating via microwave radiation can be carried out across space. Alternatively, dielectric heating may involve exposure to radio-frequency radiation.

Unlike conduction or convection, regenerating the used sorbents by dielectric heating is efficient because the energy is directly received by the used sorbents. For example, fluorinated silica is transparent to microwave radiation. This allows for faster heating with less energy loss.

In various embodiments, exposing the used sorbent to dielectric heating comprises exposing the used sorbent to microwave radiation. This can be achieved, for example, by exposing the used sorbent to microwave radiation in a microwave synthesizer. Other means for exposing the used sorbent to microwave radiation are also possible.

In various embodiments where the source of microwave radiation comes from the microwave synthesizer, the microwave synthesizer may be configured to operate at 100 to 1,200 Watts. For example, the microwave synthesizer may be configured to operate at 100 Watts, 150 Watts, 200 Watts, 250 Watts, 300 Watts, 350 Watts, 400 Watts, 450 Watts, 500 Watts, 550 Watts, 600 Watts, 650 Watts, 700 Watts, 750 Watts, 800 Watts, 850 Watts, 900 Watts, 950 Watts, 1,000 Watts, 1,050 Watts, 1,100 Watts, 1,150 Watts, 1,200 Watts, or any value therebetween.

In various embodiments, the method comprises exposing the used sorbent to microwave radiation in a microwave synthesizer configured to operate at 500 Watts.

In various embodiments, the used sorbent may be exposed to microwave radiation for any suitable period of time until a predetermined amount of adsorbed gas is released from the used sorbent. For example, the exposure period may be a continuous 3 hours or less, such as 2 hours, 1 hour, or less.

In alternative embodiments, the used sorbent may be exposed to microwave radiation for an interval of 10-30 seconds.

In various embodiments, the used sorbent may be exposed to microwave radiation at 90-150° C. or 90-120° C. For example, the exposure temperature may be set at 90° C., 95° C., 100° C., 105° C., 110° C., 115° C., 120° C., 125° C., 130° C., 135° C., 140° C., 145° C., or 150° C.

As mentioned above, the used sorbent comprises a liquid marble, wherein the liquid marble is comprised of a plurality of particles and/or mixture of a plurality of particles encapsulating at least one type of liquid therein.

As will be appreciated, the type of liquid to be comprised in the liquid marble will depend on the type of unwanted gaseous component to be removed from the gas, and therefore the choice of the liquid (or mixture of liquids) will be apparent to persons skilled in the art.

Accordingly, in various embodiments, the liquid may be selected from the group consisting of ionic liquid, alkanolamine, molecule containing amine functionality, desiccant, glycol, a solution thereof, amine-containing oligomers or polymers, and a mixture thereof. For example, if carbon dioxide or hydrogen sulfide is to be removed from a gas, then the liquid may include an amine, such as an alkanolamine. The alkanolamine may be, but not limited to, monoethanolamine (MEA), diethanolamine (DEA), triethanolamine (TEA), methyldiethanolamine (MDEA), 2-amino-2-methyl-1-propanol (AMP). The liquid may be neat (i.e. without other components), a solution thereof, or a mixture thereof. For example, the liquid may be neat MEA or an aqueous solution of MEA (such as 30%) and the resultant liquid marble may be termed dry neat MEA or dry 30% aqueous MEA, respectively. In yet further examples, the at least one type of liquid comprises a mixture of at least one alkanolamine and at least one further amine. The at least one alkanolamine may comprise MEA, DEA, or AMP and the at least one further amine may comprise, but not limited to, piperazine. In one example, the at least one type of liquid may be a mixture of DEA with piperazine.

In various embodiments, more than one type of liquid marble may be used to simultaneously remove more than one unwanted gaseous components from the gas. Accordingly, different types of nanoparticles, sub-micron particles or microparticles and/or mixture of a purality of such particles may be used to encapsulate the liquids.

For example, the plurality of particles may comprise or consist of a material selected from the group consisting of a metal, a metal oxide, an organic compound, a polymer, a composite, and a mixture thereof. In certain embodiments, the plurality of particles may be comprised of titanium dioxide ($TiO_2$), zinc oxide (ZnO), aluminium oxide ($Al_2O_3$), or cerium oxide ($CeO_2$).

Advantageously, unlike conventional methods of regenerating used sorbents whereby an inert purge gas is required, present method does not involve the use an inert purge gas in the regeneration process.

Other advantages associated with the present regeneration method can be summarized as follows:
 (a) Time required for the sorbents regeneration is reduced.
 (b) Energy consumption by the regeneration is reduced.
 (c) Overcomes the problem of sorbent loss and progressive oxidation during regeneration, and hence improves the recyclability of the dry liquid based sorbents.
 (d) Used sorbents may be recycled with minimal loss in absorption capacity.
 (e) Overcomes the limitation of slow heat transfer in conventional heating for the regeneration of powderized liquid sorbents.

In order that the invention may be readily understood and put into practical effect, particular embodiments will now be described by way of the following non-limiting examples.

EXAMPLES

Example 1

A Teflon cup containing $CO_2$-loaded dry DEA was placed in a microwave synthesizer for 1 hour, with the temperature of the dry DEA kept at approximately 120° C. The temperature of the dry DEA was measured using a thermocouple and the Schlenk tube was weighed. The decrease in weight was attributed to the desorption of carbon dioxide and verified from the extent of $CO_2$ absorbed in the next cycle.

Example 2

A programmable microwave synthesizer that is covered by U.S. Pat. No. 5,767,493 was utilized. To show removal of $CO_2$ from dry DEA, we used $CO_2$-loaded dry DEA in an open Teflon cup. The Teflon cup was put in a holder and subsequently put into the microwave synthesizer capable of delivering up to 1200 watts of power at 2450 MHz. No purge gas was used. To maintain the removal temperature of 120° C., a thermocouple was inserted into a separate Teflon cup containing neat DEA which provided feedback to the software to control the microwave power. In addition, stirring of the dry DEA within the Teflon cup was carried out as part of the microwave heating process.

About 11 grams of dry DEA containing 50 wt. % neat DEA which was loaded with approximately 1 g of carbon dioxide was placed in the open Teflon cup. The microwave power was turned on to heat the CO2-loaded dry DEA at 500 watts power for approximately 1 hour, after which the Teflon cup was removed from the microwave synthesizer and weighed. The decrease in weight was attributed to the removal of carbon dioxide.

Figure 2:
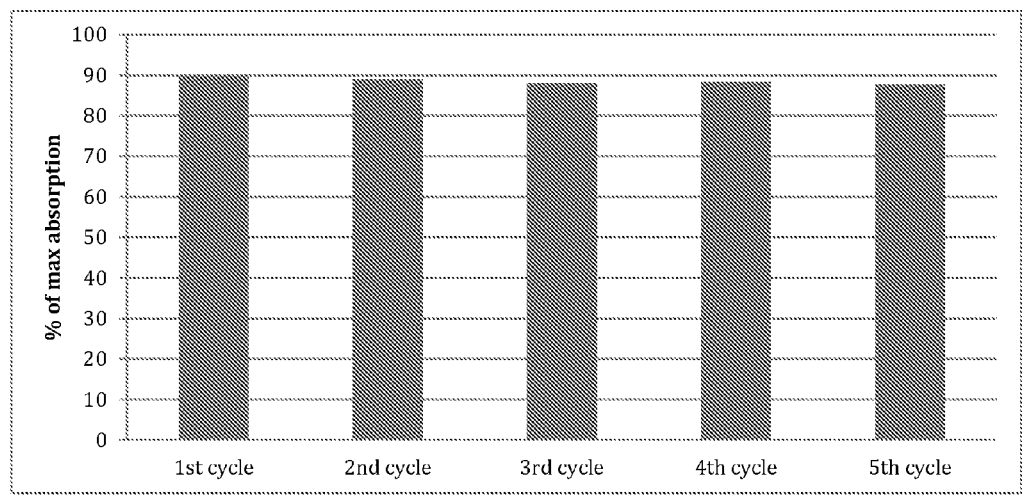
FIG. 2 shows the recyclability of dry DEA sorbent for $CO_2$ absorption, whereby the sorbent is regenerated with microwave heating and without a purge gas, under air.

To test the recyclability of the absorbent and confirm that the weight loss is correctly attributed to be removal of carbon dioxide, repeated cycles of $CO_2$ absorption and removal were carried out. The absorption capacity was found to be very stable over at least 5 cycles, as shown in FIG. 2.

Comparison of Energy Requirements

Microwave-assisted chemical reactions have been extensively reported to show increased product yield, extremely shorter processing time, and enhanced product properties or material properties, when compared to conventional heating techniques using oil baths. In present application, the time to reach the required temperature (120° C.) reduced from 10-20 minutes using oil baths to only 30 seconds' ramping time with microwave heating. Under the same conditions, the regeneration of the dry diethanolamines (DEA) solvents took only 1 hour compared to 2 hours using conventional oil bath, when running at the specified temperature (120° C.). As the actual power supplied by the microwave to reach the specified temperature is also less than that by the hotplate, the actual energy consumption using microwave heating for the regeneration will be in the order of tenth of that with hotplate, which is supported by the references that microwave-assisted chemical reactions requires only a small fraction (5-10%) of the energy needed for the traditional oil-bath heating (Kappe et al. 2008 ChemSusChem, 1, 123-13).

Rough comparisons for the actual energy consumption:

Microwave: Without any nitrogen flow in the microwave, the time taken for the regeneration is about 1 hour. The actual energy consumption by the microwave synthesizer is measured by the built-in software, and it is found to be 0.034 kWh per cycle on average.

Hotplate: The actual energy consumption by the hotplate is measured by a Watt meter. The time taken for the regeneration at 120° C. is 2 hours with purge gas, and more than 3 hours in the absence of purge gas. The total energy consumption without the use of a purge gas is approximately 0.38 kWh per cycle on average.

Hence, comparing the efficiency of microwave heating to conventional oil bath heating (both for the cases without any inert gas flow during regeneration), it is found that the microwave heating requires only 0.034/0.38=8.95% of the energy needed for the traditional oil-bath heating, which is similar to the references.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

What is claimed is:

1. A method for regenerating a used sorbent having a gas adsorbate adsorbed thereto, comprising exposing the used sorbent to dielectric heating, wherein the used sorbent comprises a liquid marble, wherein the liquid marble is comprised of a plurality of particles and/or mixture of a plurality of particles encapsulating at least one type of liquid therein.

2. The method according to claim 1, wherein exposing the used sorbent to dielectric heating comprises exposing the used sorbent to microwave radiation.

3. The method according to claim 2, wherein the used sorbent is exposed to microwave radiation in a microwave synthesizer.

4. The method according to claim 3, wherein the microwave synthesizer is configured to operate at 100 to 1,200 Watts.

5. The method according to claim 4, wherein the microwave synthesizer is configured to operate at 500 to 1,200 Watts.

6. The method according to claim 2, wherein the used sorbent is exposed to microwave radiation for 3 hours or less.

7. The method according to claim 6, wherein the used sorbent is exposed to microwave radiation for 1 hour or less.

8. The method according to claim 2, wherein the used sorbent is exposed to microwave radiation for an interval of 10-30 seconds.

9. The method according to claim 2, wherein the used sorbent is exposed to microwave radiation at 90-150° C.

10. The method according to claim 9, wherein the used sorbent is exposed to microwave radiation at 90-120° C.

11. The method according to claim 2, wherein the used sorbent is exposed to microwave radiation in the absence of an inert purge gas.

12. The method according to claim 1, wherein the gas adsorbate comprises natural gas, flue gas, carbon monoxide, carbon dioxide, hydrogen sulfide, water vapour, a sulfur-containing gas, a malodorous gas, a toxic gas, or a mixture thereof.

13. The method according to claim 1, wherein the at least one type of liquid is selected from the group consisting of ionic liquid, alkanolamine, molecule containing amine functionality, desiccant, glycol, a solution thereof, amine-containing oligomers or polymers and a mixture thereof.

14. The method according to claim 13, wherein the alkanolamine comprises ethanolamine, preferably monoethanolamine (MEA), diethanolamine (DEA), triethanolamine (TEA), methyldiethanolamine (MDEA), or 2-amino-2-methyl-1-propanol (AMP).

15. The method according to claim 14, wherein the alkanolamine comprises neat MEA or an aqueous solution of MEA.

16. The method according to claim 13, wherein the at least one type of liquid comprises a mixture of at least one alkanolamine and at least one further amine.

17. The method according to claim 16, wherein the at least one alkanolamine comprises MEA, DEA, or AMP and the at least one further amine comprises piperazine.

18. The method according to claim 14, wherein the alkanolamine comprises neat DEA or an aqueous solution of DEA.

19. The method according to claim 1, wherein the plurality of particles comprises or consists of a material selected from the group consisting of a metal, a metal oxide, an organic compound, a polymer, a composite, and a mixture thereof.

20. The method according to claim 19, wherein the plurality of particles is comprised of titanium dioxide ($TiO_2$), zinc oxide (ZnO), aluminium oxide ($Al_2O_3$), or cerium oxide ($CeO_2$).

* * * * *